United States Patent [19]

Dean et al.

[11] 4,426,816

[45] Jan. 24, 1984

[54] FASTENING MEANS

[76] Inventors: James C. Dean, 2154 N. Wallace Ave., Indianapolis, Ind. 46218; Eugene R. Barnett, 6268 Windsor Dr., Indianapolis, Ind. 46219

[21] Appl. No.: 294,467

[22] Filed: Aug. 20, 1981

[51] Int. Cl.³ .............................................. E06B 3/26
[52] U.S. Cl. ...................................... 52/202; 49/483; 160/368 R
[58] Field of Search ................ 52/202, 203, DIG. 13; 160/368 R, 354; 49/483

[56] References Cited

U.S. PATENT DOCUMENTS

| | | | |
|---|---|---|---|
| 2,899,256 | 8/1959 | Kelley | 49/483 X |
| 3,095,619 | 7/1963 | Peterson | 49/483 X |
| 4,044,813 | 8/1977 | Emmons | 160/354 X |
| 4,068,428 | 1/1978 | Peterson | 160/354 X |
| 4,182,088 | 1/1980 | Ball | 52/202 |

*Primary Examiner*—Philip C. Kannan
*Attorney, Agent, or Firm*—Robert A. Spray

[57] ABSTRACT

A fastening means utilizing, in combination, Velcro stripping and a sealing strip, thus providing that in releasably interconnecting a first panel member to a second panel member, the sealing strip carried between the panel members adjacent the Velcro strip and the cooperating Velcro strip is operative to cause an effective seal between the panel members, and is preferably resiliently deformed by the fastening interconnection of the Velcro stripping components.

1 Claim, 6 Drawing Figures

FASTENING MEANS

The present invention relates to a Velcro-type fastening means for interconnecting panel members to one another in an easily attachable and easily releasable manner.

More particularly the invention relates to a Velcro-type fastener means in combination with a sealing strip carried between the panel members adjacent the Velcro stripping components, and operative, when the Velcro components are fastened, to cause a seal between the panel members.

The concepts thus provide the special advantages assured sealing, of an effectively airtight nature, in a Velcro-type fastener strip which itself provides advantages of ease of assembly and removal or releasability, giving special advantages in certain panel installations, e.g., such that of an insulating sheet panel applied releasably over a window or a patio door in temporary periods of severe weather, yet requiring no destruction of components to achieve removability. Thus a single panel of insulating sheeting may be used and re-used, repeatedly as needed, yet with much convenience.

In a search conducted after certain particulars of this invention were made, two patents were found, representative of the prior art for Velcro-type fastening means for panels. These are now shown to indicate a nature of the present concepts wholly unsuggested by this prior art, thus emphasizing that the apparent simplicity indicated by viewing the invention by hindsight is not indicative of the nature of the inventive concepts themselves, for indeed they are shown to be a departure.

The two patents were as follows: U.S. Pat. No. 4,068,428 of O. J. Peterson III (1978), and U.S. Pat. No. 4,249,589 of N. S. Loeb (1981).

These patents illustrate the use of Velcro stripping for releasably attaching some sort of insulation or other environment-controlling sheeting to a window installation; however these do not show or suggest any sort of combination involving a sealing strip by which effective air-tightness may be achieved.

The above description is of an introductory and generalized nature, particularly to mention the general objects and achievements and desirability of the present invention.

More particular and specific concepts, features, advantages, and details are set forth in the following more detailed description of embodiments illustrative of the invention's concepts, taken in conjunction with the accompanying drawings.

In those drawings, which are somewhat schematic and diagrammatic in nature, it will be noted as follows:

All Figures are a cross-sectional view through an installation of a fastening means according to the embodiment of the invention. More particularly:

Figure 1:
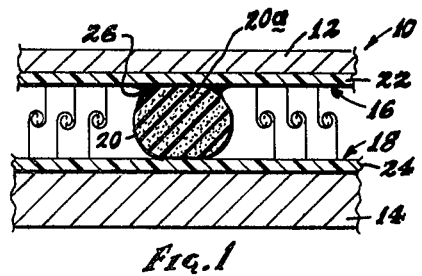
FIG. 1 illustrates the invention of the form shown in FIG. 2, with FIG. 1 showing the members in fastened condition in which a sealing strip is resiliently compressed by the fastening of the Velcro stripping components, and the Velcro stripping being shown as mounted respectively on two panel members.

As shown in the drawings, the present invention provides an advantageous fastening means 10 for releasably interconnecting a first panel member 12 to a second panel member 14. Typical or illustrative panels connectable by the fastening means 10 are insulation sheets to residence walls; for it is desirable to apply such sheeting over windows or patio door in a manner which permits convenient removal and re-use on a seasonal basis.

More particularly, it is noted that the fastening means 10 comprises a Velcro strip 16 on one of the panel members 12 and a co-operating Velcro strip 18 on the other 14 of the panel members, and there is a sealing strip 20 carried between the panel members 12-14 adjacent the Velcro strip 16 and the co-operating Velcro strip 18.

Figure 3:
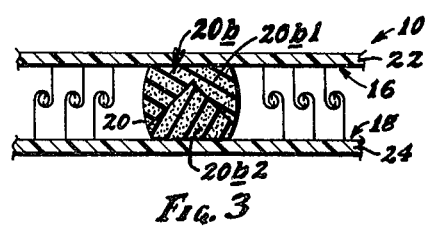
FIG. 3 illustrates a second embodiment of the invention, as shown in FIG. 4, but in FIG. 3 the parts being shown in fastened position with the sealing strip means being resiliently compressed.

As shown best in FIGS. 1 and 3, the sealing strip is of such a cross-sectional size and configuration, with reference to the height of the Velcro strips 16 and 18, that the operative meshing of the Velcro strip 16 and the co-operating Velcro strip 18 is operative to cause a seal between the panel members 12 and 14, making the seal effectively air-tight.

In the illustrative embodiments, there are provided a Velcro strip and a co-operating Velcro strip adjacent both sides of the sealing strip, although in certain installations only one edge of the sealing strip 20 need have the Velcro strips, usually preferably the outer edge considering the entire panel area to be covered.

The Velcro strips 16 and 18 are shown as releasably intermeshing members carried by supporting strips 22 and 24; and each of the supporting strips 22 and 24 will be understood as secured respectively to a panel 12 or 14, by whatever means is desired.

Schematically shown in FIGS. 1 and 3, desirably the operative meshing of the Velcro strip 16 and co-operating Velcro strip 18 is operative to achieve a resilient deformation of the sealing strip 20, thereby better assuring the achieving of an operatively airtight seal between the panel members 12 and 14. FIG. 1 illustrates the resiliently deformed sealing strip 20a of FIG. 2. FIG. 3 illustrates the resiliently deformed sealing strip 20b of FIG. 4, the strip 20b being shown as made of interfitting members 20b1 and 20b2.

Figure 6:
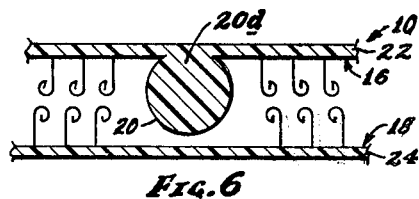
FIG. 6 illustrates an embodiment in which the sealing strip is shown as formed integrally with one of the Velcro strip components, the parts being shown in this view in non-fastened condition.

In the FIG. 6, there is illustrated a generally circular sealing strip 20d shown as formed integrally with the supporting strip 22. It would provide an operatively good seal, although not necessarily as airtight as the seal obtained in the embodiments (FIGS. 1 and 3) in which a resilient deformation of the sealing strip is achieved.

Figure 2:
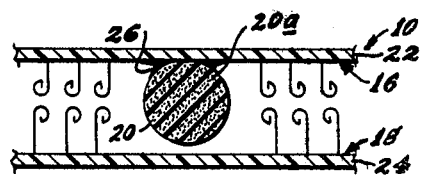
FIG. 2 illustrates a first embodiment of the invention, but the parts being in non-fastened position, this embodiment showing the sealing strip being pre-secured to one of the Velcro strip components.

It may be desired to provide extra ease of installation by having the sealing strip pre-attached to one of the supporting strips, as indicated by the adhesive 26, in FIGS. 1 and 2, by which the sealing strip 20a is shown pre-secured to the supporting strip 22.

Figure 4:
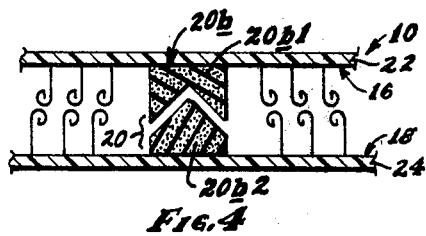
FIG. 4 illustrates the embodiment shown also in FIG. 3, and in which the interfitting components of the sealing strip means in FIG. 4 are shown diagrammatically in separate condition, and the Velcro stripping is shown as non-fastened.
Figure 5:
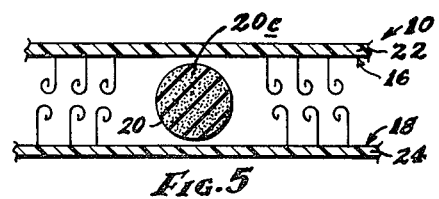
FIG. 5 illustrates an embodiment in which the sealing strip is not fastened to either Velcro strip component.

The cross-sectional shape of the sealing strips may be varied according to the desire of the manufacturer, considering factors such as availability, use of standard stock component(s), expense, assurance of seal, long-term resilience, etc. Thus FIGS. 1, 2, 5, and 6 show a sealing strip of generally circular cross-section, whereas the embodiment of FIG. 4 illustrates a sealing strip 20b of generally rectangular shape, made up by a pair of interfitting strips 20b1 and 20b2 as already noted.

It is thus seen that a fastening means according to the inventive concepts, provides a desired and advantageous device, yielding the advantages and economy of a Velcro fastener installation combined with a sealing strip for an operatively air-tight assembly.

Accordingly, it will thus be seen from the foregoing description of the invention according to these illustrative embodiments, considered with the accompanying drawings, that the present invention provides new and useful concepts of a fastener means utilizing Velcro stripping and a sealing strip in a useful combination, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

In using terms such as Velcro, Velcro strip, Velcro-type, and other expressions including the word "Velcro" (which is reported to be a Trademark by S. and W. Framing Supplies, Inc., 1845 Highland Ave., New Hyde Park, N.Y. 11040, and/or Velcro Corp., 681 Fifth Ave., New York, N.Y. 10022) it is pointed out that the concepts relate to hook-and-loop fasteners of whatever manufacturer, such as are used for closing panels of jackets and pockets, garment fasteners, pocketbook closures, etc., and the invention and its concepts are not limited to use of those bearing a Velcro trademark even though that is the term used herein for brevity as indicated hook-and-loop fasteners.

Likewise, the invention is not limited to the use of a sealing strip in combination with any particular type or nature of the inter-acting components of the co-operating bodies of what are referred to as Velcro type of strip members. That is, the releasably fastenable co-operating components may be of individual generally J-shaped members or members of a sort of L-shape, connectable to a sort of a shag-rug-like piles or body composed of upstanding generally U-shaped loops, or generally J-shaped members or members of a sort of L-shape provided as portions of generally U-shaped components connectable to such generally U-shaped loops, or other type of enlarged-head members releasably connectable with hook-shaped or enlarged-head members, etc., which provide an interlocking effect. All of these or similar releasably fastenable bodies are included herein within the concept referred to as Velcro or Velcro-type stripping.

What is claimed is:

1. A fastening means for releasably interconnecting a first panel member to a second panel member,
   the fastening means comprising a Velcro type strip on one of the panel members and a co-operating Velcro type strip on the other of the panel members,
   there being a sealing strip carried between the panel members adjacent the Velcro type strip and the co-operating Velcro type strip,
   the sealing strip being of such a cross-sectional size and configuration, in comparison to the height of the Velcro type strips, that the operative meshing of the Velcro strip and the co-operating Velcro type strip is operative to cause a seal between the panel members,
   in a combination in which there are Velcro type strip portions and co-operating Velcro type strip portions adjacent and along both sides of the sealing strip although not over the sealing strip,
   the operative meshing of the Velcro type strip portions and co-operating Velcro type strip portions along both sides of the sealing strip although not over the sealing strip being thus operative, independently of rigidity of the panel members, to achieve a compression and a resilient deformation of the sealing strip, thereby better assuring an operatively airtight seal between the panel members when the Velcro type strip portions along both sides of the sealing strip are caused to operatively mesh with one another.

* * * * *